Figure 1:
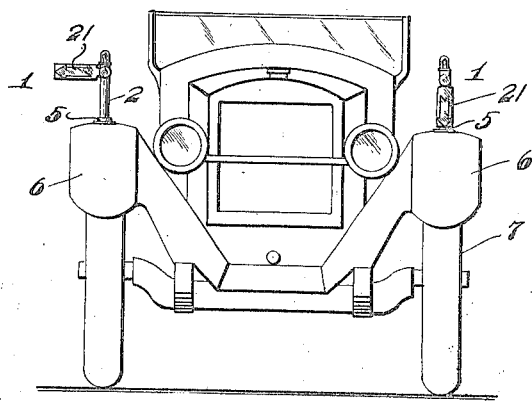

Jan. 9, 1923.

P. W. PADDEN ET AL.
DIRECTION SIGNAL.
FILED NOV. 5, 1920.

1,441,877.

Inventors
Patrick W. Padden
Orland C. Reynolds
By C. C. Shepherd Attorney

Patented Jan. 9, 1923.

1,441,877

UNITED STATES PATENT OFFICE.

PATRICK W. PADDEN AND ORLAND C. REYNOLDS, OF MAUMEE, OHIO.

DIRECTION SIGNAL.

Application filed November 5, 1920. Serial No. 421,813.

*To all whom it may concern:*

Be it known that PATRICK W. PADDEN and ORLAND C. REYNOLDS, citizens of the United States, residing at Maumee, in the county of Lucas, and State of Ohio, have invented certain new and useful Improvements in Direction Signals, of which the following is a specification.

This invention relates to improvements in direction signals for motor vehicles, and has for its primary object to provide an improved signal capable of being mounted upon a conspicuous portion of a motor vehicle and to embody improved features of construction and control so that the operator of the vehicle by operating the signal will be enabled to clearly notify adjacent persons or vehicle operators as to the exact course or contemplated movements of direction or control on the part of the vehicle carrying the signal.

In carrying out the invention use is made of a signal or direction indicator of the character stated wherein is embodied a casing capable of being secured to one of the fenders of a motor vehicle, or in any other desired position, said casing having rotatably journaled therein a crank shaft to which a signal arm is fixed, whereby upon the rotation of said shaft the arm may be swung to assume active or inactive signalling positions, said crank shaft being actuated by means of an electromagnet located within the casing and with which a movable armature is connected, the latter in turn being connected with said crank shaft, in such manner that when said magnet is excited the armature will be attracted thereto so as to effect the rotation of said shaft and the consequent raising of the signalling arm to an active position, the weight of the arm being such that when the magnet is de-energized, the said arm will gravitate and will thereby automatically assume an inactive position.

Other specific objects of the invention reside in the provision of a vehicle signal wherein is embodied an improved mounting for the rotatable crank shaft, the mounting being such that the element of friction involved in effecting its rotatable support will be reduced to a minimum so that but a relatively small amount of electric current will be needed in effecting the rotation of the shaft; in providing an improved connection between the inner end of the signalling arm and the crank shaft so that the momentum of the arm when oscillated repeatedly and brought to abrupt stops will not be sufficient to disrupt the rigid connection between the inner end of the arm and the crank shaft; in forming the armature construction in the nature of a weight, so that the weight of the signalling arm will be substantially counterbalanced, a feature which materially contributes toward rendering the signal economical to operate, particularly from a standpoint of current consumption; in securely housing and mounting the operating parts of the signal so that said parts will not be exposed to the detrimental effects of dust, dirt and the elements; and in finally providing the casing with a source of illumination operative upon the raising of the signalling arm to illuminate the latter, whereby said arm may be utilized efficiently at night as well as for day operation.

With these and other objects in view, as will appear as the description proceeds, the invention accordingly consists in the novel features of construction, combinations of elements and arrangements of parts, hereinafter to be fully described and pointed out in the claim hereunto appended.

Figure 2:
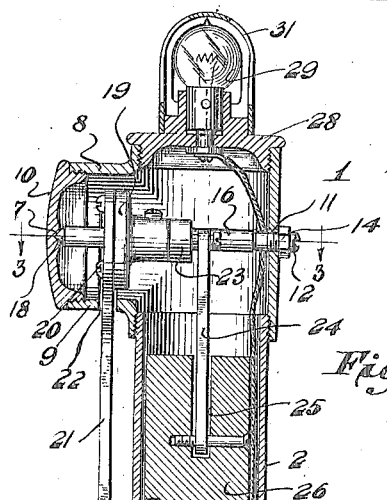
Figure 3:
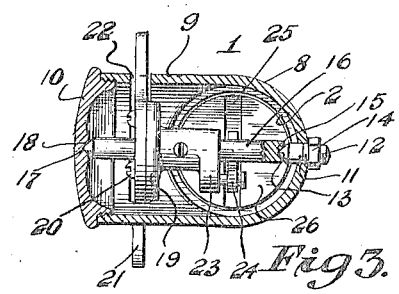
Figure 4:
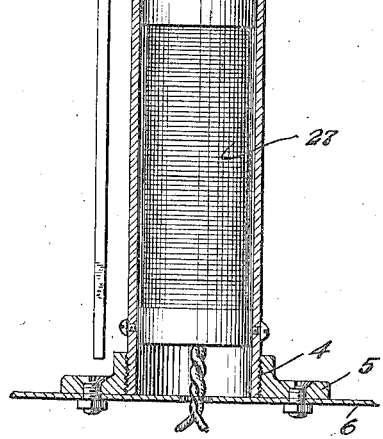

In the accompanying drawing, forming a part of this specification and in which similar characters of reference denote like and corresponding parts throughout the several views thereof;

Figure 1 is a front elevation of a motor driven vehicle and illustrating particularly the application and use of the direction signal comprising the present invention thereto, Figure 2 is a vertical sectional view taken through the direction signal and illustrating specifically the construction of enclosed parts, Figure 3 is a transverse horizontal sectional view disclosing the construction for rotatably supporting the crank shaft, and Figure 4 is a detail perspective view of the crank shaft.

Referring more particularly to the accompanying drawing, the numeral 1 designates the improved direction signal comprising the present invention in its entirety. In the form of the invention disclosed, this signal consists of a casing 2, which in this instance is in the nature of a tubular standard. In order that the signal may be conspicuously carried by a motor vehicle, the lower end of the standard is suitably threaded as at 4 so as to be received within a flanged collar 5, the latter being riveted or otherwise positively secured to the fender 6 of a motor vehicle 7. In practice, it will be understood that a part of the signals 1 is mounted upon a vehicle, in order that the signals may be used effectively and clearly for denoting various contemplated movements on the part of the vehicle. Since the signals are of identical construction it will only be necessary to describe one of the same for convenience in description.

The upper end of the standard 2 is threaded to receive a substantially T shaped fitting 8, whose horizontal branch 9 is internally threaded to receive a removable end plate 10. Located in longitudinal axial relation with the longitudinal axis of the branch 9 is a threaded bore 11, formed in one of the walls of the fitting 8, said bore being arranged to receive an adjustable screw 12 having a pointed inner end 13, disposed within said fitting, the outer end of said screw being arranged to project exteriorly of the fitting and in this instance is equipped with a lock-nut 14 whereby the adjustment of the screw 12 may be maintained. Disposed to be received by the pointed end 13 of the screw 12 is a pocket or depression 15 provided in one end of a crank shaft 16. This shaft extends axially of the branch 9 and is in turn provided at its other end with a pointed extremity 17, so disposed as to be received within a depression 18 provided in the inner face of the removable end plate 10. Manifestly, by this construction the crank shaft may be rotatably supported within the fitting 8, and that by reason of the point bearings disclosed, the element of friction involved in effecting its rotation will be of an inconsequential nature. By rendering the screw 12 adjustable the shaft may be readily adjusted and properly trued for correct rotation.

Fixed to the shaft 16 is a flanged hub 19, which latter is connected with the shaft 16 for rotation in unison therewith, either a key or a set screw may be employed to produce this connection. The flange of the hub 19 is suitably bored to receive screws 20, which are employed for the purpose of fastening the inner end of a signalling arm 21 in rigid and secured relationship with the crank shaft. As will be hereinafter explained, the arm 21 oscillates swiftly, and is abruptly brought to a signalling or horizontal position. The momentum set up by the oscillation of the arm in past structures has frequently resulted in the loosening of the arm upon the shaft 16, or an equivalent member, and it is to overcome this loosening that the hub and screw connection 19 and 20 respectively is provided. The arm itself may be of any suitable construction or of any desired length, in this instance the length thereof being determined by the distance between the crank shaft 16 and the fender, since normally the arm will assume a vertical position and will drop by gravity so as to extend vertically and parallel with the standard 2. The inner end of the arm is reduced so as to pass through an arcuate slot 22 provided in the bottom of the fitting 8 or more specifically the wall of the branch 9, this construction enables the shaft 16 to be entirely enclosed or in other words to avoid exposed or exterior parts. The exposed portions of the arm 21 may be suitably designed, colored or provided with any desired indicia whereby the directions indicated by the arm may be suitably emphasized and called to the attention of surrounding persons. By removing the plate 10, the parts contained within the fitting 8 will be rendered conveniently accessible.

To effect the rotation of the shaft 16 and consequently the operation of the signalling arm 21, one end of said crank shaft is provided with a crank arm 23 to the outer end of which is pivotally connected a link 24, the latter being disposed to extend downwardly and to be received within the bifurcated end 25 of a soft iron weight 26 which normally hangs from the link 24 within the standard tube. The weight of the arm 21 slightly exceeds that of the weight 26 and consequently said arm will normally gravitate to a lowered inactive position, however, after upward movement on the part of said arm has been initiated by a slight extraneous power, the weight 26 will be sufficient to revolve said arm to its raised or active position. In other words, the weight 26 substantially counterbalances the arm 21, permitting the latter to swing freely around its point bearings to be capable of being readily actuated. In this instance the bottom of the standard 2 is provided with an electromagnet 27 which has a range of attraction capable of operating upon the weight 26, which in effect constitutes an armature. The wings of the magnet 27 may constitute a part of a suitably energized circuit capable of being controlled by the will of the vehicle operator, the arrangement being such that when said magnet, or its equivalent, is energized, the weight 26 will be attracted thereto, causing a downward pull on the link 24, which by reason of its connection with the arm 23, will effect the rotation of the shaft 16. Obviously, upon the rotation of the shaft 16 the arm 21 will be elevated so as to assume its signalling position. When de-energized, the weight of the arm 21 is sufficient to effect the automatic raising of the weight 26 and, also, to allow the arm to assume its inactive position by responding to gravitation.

The upper end of the fitting 8 is equipped with a removable plug 28, which carries a small incandescent bulb 29, the latter carrying wires 30, which are connected with the wings of the magnet 27, so that when the latter is energized, the bulb 29 will be energized to illuminate the arm 21, thus rendering the latter clearly discernible during periods of directions. A shield 31 may be employed to surround the bulb 29 in order to protect the latter against accidental injury.

From the foregoing description taken in conjunction with the accompanying drawing, it is believed that the construction, operation and advantages of the invention will be clearly understood by those versed in the art. In the form of the invention disclosed a pair of the signals 1 have been mounted upon the fender construction of the vehicle 7. While the use of the signals in this position may be admirably carried out, yet, it should be understood that said signals are capable of being mounted at other conspicuous points upon a motor vehicle such, for example, as the rear fenders, or the windshield construction. Moreover, it will be understood that the magnets of the signals may be suitably wired in connection with the source of electrical energy, so that by the actuation of manual switches, conveniently located with respect to the vehicle operator, the said signals may be either simultaneously or selectively actuated to denote intended directions to be pursued by the vehicle. By reason of its construction, the signal may be readily manufactured and applied to the average motor vehicle, and by reason of the features of construction above pointed out, the up-keep or operation of the signal may be effected positively and economically.

What is claimed is:

In a direction signal, a tubular standard, a substantially T shaped fitting carried by the upper end of said standard, a removable plate carried by said fitting, an operating shaft, disposed transversely of the casing and having one end pivotally supported in the fitting and the other end supported by the plate, a signalling arm connected with said shaft and arranged to project through an arcuate slot provided in said fitting, a counterbalancing member movably mounted within said standard and having a linked connection with said shaft, and an electro responsive device positioned within said standard and co-operative with said counterbalancing member to effect the rotation of said shaft.

In testimony whereof we affix our signatures.

PATRICK W. PADDEN.
ORLAND C. REYNOLDS.